INVENTOR.
Leland W. Gilliatt
BY
Roberts, Cushman & Grover
ATT'YS

United States Patent Office 3,336,502
Patented Aug. 15, 1967

3,336,502
AUTOMATIC HEATER CONTROL SYSTEM FOR AMALGAM PRESSURE CONTROL OF FLUORESCENT LAMPS
Leland W. Gilliatt, Marblehead, Mass., assignor to Sylvania Electric Products Inc., a corporation of Delaware
Filed Dec. 31, 1963, Ser. No. 334,785
15 Claims. (Cl. 315—108)

This invention relates to vapor discharge lamps such as mercury vapor fluorescent lamps and particularly to the control of mercury vapor pressure within the lamp.

As is well known, the illuminating efficiency of a fluorescent lamp, for example, drops off from its maximum as the pressure of mercury vapor, being dependent on temperature, varies above or below an optimum, typically about three microns at about 32° C. at the coolest part of the lamp envelope. In many installations, particularly in almost completely enclosed fixtures such as troffer fixtures, or where the ambient temperature rises very high at times, the lamp may be required to operate at temperatures considerably above 40° C. with consequent reduction in efficiency.

It is possible to reduce the mercury vapor pressure with various devices which cool the lamp. Internal disks shielding the ends of the lamp from the heat of the mercury arc discharge provide cold spots at the ends which reduce pressure by condensing the mercury vapor. Metal heat conductors in contact with the exterior of the lamp will cool the lamp. Ventilating arrangements in the lamp fixture will provide a passage for cooling convection currents. A new type of fluorescent lamp called a high thermal very high output (VHO) lamp has a ring of indium coated around its inside wall at the middle of the lamp. Mercury pressure in such a lamp is reduced by amalgamation of the mercury fill with indium.

While lamps provided with such pressure reducing devices operate more efficiently than ordinary lamps at elevated temperatures, they suffer from the inherent drawback of lower efficiency operation at normal or low ambient temperatures.

It is an object of the present invention to provide a way of greatly extending the efficient operating temperature range of lamps and fixtures having means for reducing the mercury pressure within the lamp.

The invention in one form relates to a circuit for a mercury filled fluorescent lamp of the type having an elongate envelope with electrodes at each end and a coat of mercury-amalgamative metal on the inner surface of the envelope in a restricted zone intermediate the electrodes, said circuit comprising a power supply for applying operating current to the lamp, and means connected to said power supply for applying heat substantially only to the exterior of said envelope adjacent said restricted zone, thereby to control the mercury vapor pressure within the lamp.

For the purpose of illustration typical embodiments of the invention are shown in the attached drawing in which.

Figure 1:
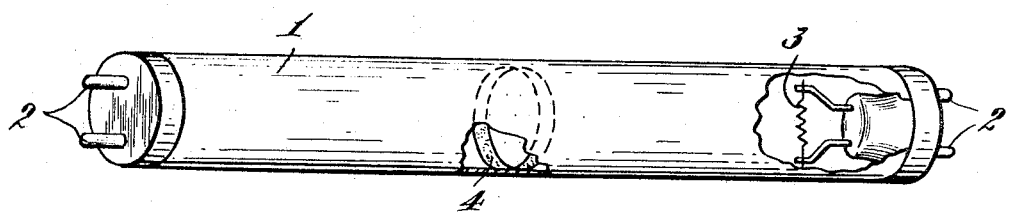
FIG. 1 is a side elevation of a fluorescent lamp partly broken away.

Shown in FIG. 1 is a high thermal VHO lamp comprising a glass envelope 1 with terminal pins 2 at each end connected to an internal emissive electrode 3. The lamp is filled with a small amount or rare gas, such as argon, at low pressure, for example, one or two millimeters, and a filling of mercury. At the middle of the lamp is a narrow ring 4 of indium coated on the inner surface of the glass envelope 1. For a lamp with an envelope about four feet long and 1½ inches in diameter about 90 mg. of mercury and 180 mg. of indium may be used. The indium may be deposited by heating the envelope to about 160° C. and rotating the envelope while a pellet of indium is held against the inner wall of the envelope. A spot of indium may be deposited instead of a ring.

Figure 3:
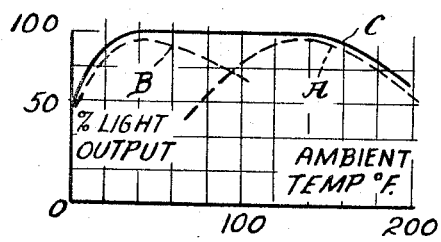
FIG. 3 is a graph showing light output of fluorescent lamps versus ambient temperature.

In FIG. 3, curve A shows the operating characteristic of such a lamp in terms of percentage of maximum light output versus ambient temperature. The high thermal VHO lamp has maximum output at about 140° F. ambient, as compared to a conventional VHO lamp which peaks at about 70° F. As is apparent, the high thermal lamp operates with very low efficiency in the range of the conventional VHO lamp.

Figure 4:
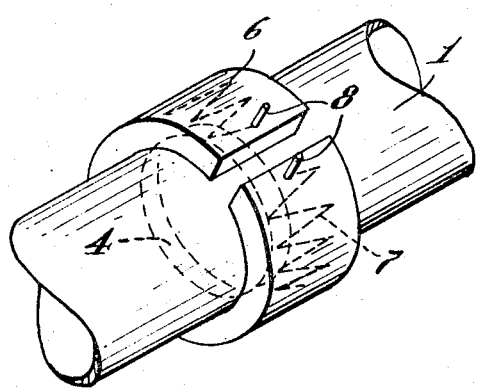
FIG. 4 is a fragmentary isometric view of a heating device applied to the fluorescent lamp of FIG. 1.

According to one form of the invention the efficient operating range of the high thermal VHO lamp is extended from the range of curve A into the range of curve B by providing a heater in the form of a collar which embraces the high thermal lamp outside the indium ring. The heater is designed to heat the portion of the lamp at the indium ring to its optimum operating temperature near or at 140° although the ambient temperature is considerably lower. The effect of such heating is to release mercury amalgamated with the indum band, thereby increasing the mercury vapor pressure and providing a second range of efficient operation as shown by curve B of FIG. 3. That is, the lamp is enabled to operate efficiently in the lower ambient temperature range of curve B when heated by the collar, as well as in its high ambient temperature range shown by curve A when heated by the surrounding atmosphere to ambient temperature. As shown in FIG. 4 the heater 6 comprises a collar containing a resistance heating element 7 with terminals 8. In lamps having a spot of indium instead of a ring, a small radiant heater directed at the spot may be used instead of a collar.

Figure 2:
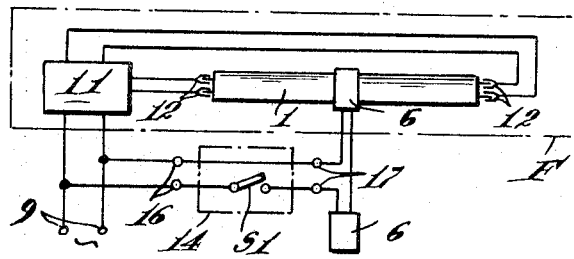
FIG. 2 is a schematic diagram of one form of lamp circuit according to the invention.

One circuit for the lamp and heating collar is shown in FIG. 2. Therein, a fixture or housing F contains the usual alternating current power terminals 9 connected to a ballast 11 which supplies operating current to terminals 12 which engage the pins 2 of the lamp and electrically and mechanically connect the lamp in the fixture. In the circuit of FIG. 2 a switch S1 is used to connect two or more heaters 6 in a series across the power terminals 9. The switch S1 may be located in a box 14 remote from the fixture F so that it may be opened manually when the ambient temperature rises to a selected value, for example 95° F. As shown in FIG. 2, the switch box 14 is connected between two power terminals 16 and two heater terminals 17. Such manual control provides an operating characteristic which includes the high efficiency portions of both curves A and B in contrast to a lamp with the operating characteristic of curve A or B alone.

Figure 5:
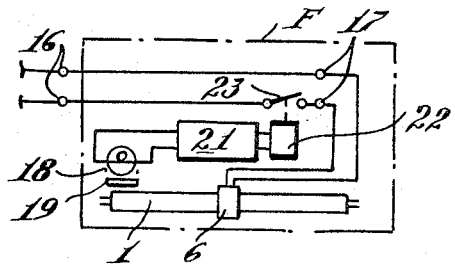
FIGS. 5 and 6 are schematic diagrams of sub circuits useful in the circuit of FIG. 2.
Figure 6:
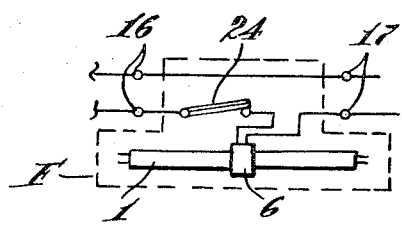

Instead of manual control, automatic control of the heater 6 may be provided by subcircuits including means for sensing thermal energy adjacent the lamp 1 as shown in FIGS. 5 and 6. The subcircuits of these figures are adapted to be connected between the power terminals 16 and heater terminals 17 of the circuit. Both subcircuits are located within the same fixture F as is the lamp or lamps to be controlled.

The control circuit of FIG. 5, which I do not claim per se as invention, comprises a polycrystalline cadmium selenide photocell 18 substantially responsive to infrared light between 7000 and 8500 angstrom units. A red filter 19, such as a Kodak-Wratten Gelatin Filter No. 87C, is placed between the cell and a lamp 6. A cell so filtered is sensitive to thermal energy in the infrared range radiated from the lamp 1, and is not substantially responsive to other ambient or visible light. The cell is connected in the grid circuit of a conventional 2D21 thyratron photocell circuit 21 having a relay coil 22 in its plate circuit. A relay switch 23 is closed by the relay 22 when infrared energy adjacent the lamp drops below a value corresponding to the vapor pressure within the lamp at an ambient temperature of about 135° F., thereby connecting the heater 6 to the power terminals 16 and 17. Since the heater is designed to heat the indium ring portion of the lamp to about 140° at ambient temperature as low as zero, it would tend to overheat the lamp if the ambient temperature is as high as 135°. However, raising the indium ring portion of the lamp above about 135° F. causes the relay 22 to open the switch 23. The very sensitive control of the circuit allows the lamp to operate on the curve C of FIG. 3, that is at substantially 100% efficiency between the two optimum peaks of curves A and B.

The subcircuit of FIG. 6 operates with somewhat less sensitive control but such as to hold the lamp characteristic close to that of curve C. This subcircuit comprises a bimetallic or similar thermostatic switch 24 connected between a power terminal 16 and a heater terminal 17 and located adjacent the lamp 1. The switch 24 is adjusted to close as the ambient temperature adjacent the lamp drops below about 130° F.

It should be understood that other equivalent ways of manually or automatically switching power to an electrical heater may be used, and that other heating means may be substituted for the resistive heater shown depending on the kind of vapor pressure reducing device associated with the lamp to be controlled. Thus the invention includes all modifications and equivalents within the scope of the accompanying claims.

I claim:

1. A circuit for a mercury filled fluorescent lamp of the type having an elongate envelope with electrodes at each end and a body of mercury-amalgamative metal in a restricted zone at the inner surface of the envelope intermediate the electrodes, said circuit comprising a power supply for applying operating current to the lamp, and means connected to said power supply for applying heat substantially only to the exterior of said envelope adjacent said restricted zone, thereby to control the mercury vapor pressure within the lamp.

2. A circuit for a mercury filled fluorescent lamp of the type having an elongate envelope with electrodes at each end and a body of mercury-amalgamative metal in a restricted zone at the inner surface of the envelope intermediate the electrodes, said circuit comprising power terminals, lamp terminals for connection to the lamp, a power supply for the lamp connected between said power terminals and lamp terminals including a ballast, and means connected to said power supply for applying heat substantially only to the exterior of said envelope adjacent said restricted zone, thereby to control the mercury vapor pressure within the lamp.

3. A circuit for a mercury filled fluorescent lamp of the type having an elongate envelope with electrodes at each end and a body of mercury-amalgamative metal in a restricted zone at the inner surface of the envelope intermediate the electrodes, said circuit compirsing power terminals, lamp terminals for connection to the lamp, a power mediate the electrodes, said circuit comprising power terminals and lamp terminals including a ballast, means connected to said power supply for applying heat substantially only to the exterior of said envelope adjacent said restricted zone, and means for connecting said heat applying means to said power supply thereby to control the mercury vapor pressure within the lamp.

4. A circuit for a mercury filled fluorescent lamp of the type having an elongate envelope with electrodes at each end and a body of mercury-amalgamative metal in a restricted zone at the inner surface of the envelope intermediate the electrodes, said circuit comprising power terminals, lamp terminals for connection to the lamp, a power supply for the lamp connected between said power terminals and lamp terminals including a ballast, means connected to said power supply for applying heat substantially only to the exterior of said envelope adjacent said restricted zone, and means sensitive to thermal energy adjacent said lamp to connect said heat applying means to said power supply when the ambient temperature of the lamp is below optimum thereby to control the mercury vapor pressure within the lamp.

5. A circuit for a fluorescent lamp of the type having an elongate envelope with electrodes at each end and a body of mercury-amalgamative metal in a restricted zone at the inner surface of the envelope intermediate the electrodes, said circuit comprising power terminals for connection to an alternating current supply, lamp terminals for connection to the lamp, a ballast connected between the power and lamp terminals, and means connected to said power terminals for applying heat substantially only to the exterior of said envelope adjacent said restricted zone.

6. An installation for a mercury filled fluorescent lamp of the type having an elongate envelope with electrodes at each end and a body of mercury-amalgamative metal in a restricted zone at the inner surface of the envelope intermediate the electrodes, said installation comprising power terminals for connection to an alternating current supply, lamp terminals for connection to the lamp, a power supply for the lamp connected between said power terminals and lamp terminals including a ballast, means connected to said power supply for applying heat substantially only to the exterior of said envelope adjacent said restricted zone, and switch means for disconnecting said heat applying means from said power supply, thereby to control the mercury vapor pressure within the lamp.

7. A fixture for a mercury filled fluorescent lamp of the type having an elongate envelope with electrodes at each end and a body of mercury-amalgamative metal in restricted zone at the inner surface of the envelope intermediate the electrodes, said fixture comprising a housing containing power terminals for connection to an alternating current supply, lamp terminals for connection to the lamp, a power supply for the lamp connected between said power terminals and lamp terminals, means connected to said power supply for applying heat substantially only to the exterior of said envelope adjacent said restricted zone, and means responsive to thermal energy adjacent said lamp to connect said heat applying means to said power supply, thereby to control the mercury vapor pressure within the lamp.

8. A fixture for mercury filled fluorescent lamp having means for reducing the mercury vapor pressure within the lamp so as to elevate the optimum ambient operating temperature of the lamp, said fixture comprising a housing containing means for sensing thermal energy adjacent the lamp and means for variably applying heat to the lamp, said heat applying means being controlled by said sensing means so as to apply heat to the lamp when the ambient temperature is below said optimum temperature.

9. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals, and electrically operated heating means connected to said power supply, said heating means being so adapted and disposed in said housing as to apply heat substantially only to the exterior of said envelope adjacent said restricted zone, thereby to control the mercury vapor pressure within the lamp.

10. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals, and electrical heating means connected to said power supply, said heating means being so adapted and disposed in said housing as to apply heat substantially only to the exterior of said envelope adjacent said restricted zone, and means to control said heating means thereby to control the mercury vapor pressure within the lamp.

11. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals, and electrical heating means connected to said power supply, said heating means being so adapted and disposed in said housing as to apply heat substantially only to the exterior of said envelope adjacent said restricted zone, and switching means for controlling said heating means thereby to control the mercury vapor pressure within the lamp.

12. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals including ballast means, and electrical resistive heating means connected to said power supply, said heating means being so adapted and disposed in said housing as to apply heat substantially only to the exterior of said envelope adjacent said restricted zone, and means sensitive to thermal energy adjacent said lamp for controlling said heating means thereby to control the mercury vapor pressure within the lamp.

13. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals, and electrical heating means connected to said power supply, said heating means being so adapted and disposed in said housing as to apply heat substantially only to the exterior of said envelope adjacent said restricted zone, and thermostatic switch means adjacent said lamp for controlling said heating means thereby to control the mercury vapor pressure within the lamp.

14. A fixture for a mercury filled fluorescent lamp of the type having an elongate envelope with terminals connected to electrodes at each end and a body of mercury-amalgamative metal in a restricted zone at the inner surface of the envelope intermediate the electrodes, said fixture comprising a housing, power terminals for connection to an alternating current supply, lamp socket terminals for engaging the electrode terminals and supporting the lamp in the housing, a power supply for the lamp connected between said power supply and lamp socket terminals, and electrical heating means connected to said power supply, said heating means comprising a collar enclosing a resistance heating element and adapted to embrace said lamp so as to apply heat substantially only to the exterior of said envelope adjacent said restricted zone, thereby to control the mercury vapor pressure within the lamp.

15. A fixture for a mercury filled fluorescent lamp of the type having means for reducing the mercury vapor pressure within the lamp, said fixture comprising a housing, power terminals in the housing for connection to an alternating current supply, lamp socket terminals for engaging the lamp, a power supply for the lamp connected between said power terminals and lamp terminals, electrical means connected to said power supply for applying heat to the lamp, and means for sensing thermal energy adjacent said lamp, and switching means responsive to said sensing means to control said electrical means so as to cause said electrical means to apply heat to the lamp when the ambient temperature is below said optimum temperature.

References Cited
UNITED STATES PATENTS

| | | | |
|---|---|---|---|
| 1,908,648 | 5/1933 | Spaeth | 315—108 |
| 2,113,314 | 4/1938 | Brueckmann | 313—116 X |
| 2,191,507 | 2/1940 | Spanner | 313—180 X |
| 2,961,564 | 11/1960 | Kenty | 313—180 X |
| 3,007,071 | 10/1961 | Lompe et al. | 313—178 |
| 3,077,079 | 2/1963 | Pietsch | 62—3 |
| 3,152,278 | 10/1964 | Dziergwa et al. | 313—109 X |
| 3,192,724 | 7/1965 | Cummings | 62—3 |

JAMES W. LAWRENCE, *Primary Examiner.*

DAVID J. GALVIN, *Examiner.*

C. R. CAMPBELL, *Assistant Examiner.*